(No Model.)
E. MYRICK.
WAGON DASHER.
No. 300,390. Patented June 17, 1884.
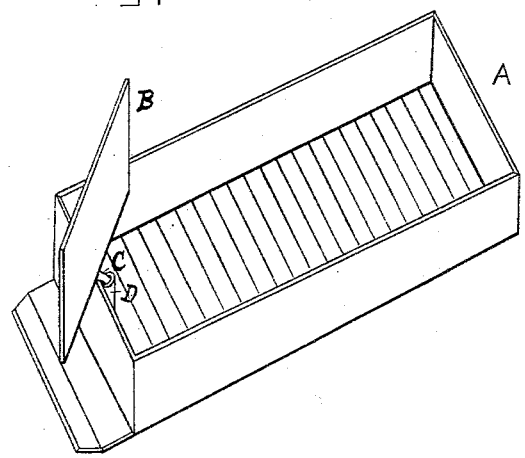
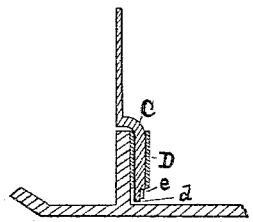
Witnesses:
J. R. Gray
M. H. Gray
Inventor.
Elijah Myrick

United States Patent Office.

ELIJAH MYRICK, OF HARVARD, MASSACHUSETTS.

WAGON-DASHER.

SPECIFICATION forming part of Letters Patent No. 300,390, dated June 17, 1884.

Application filed April 2, 1884. (No model.)

*To all whom it may concern:*

Be it known that I, ELIJAH MYRICK, a citizen of the United States, residing at Harvard, in the county of Worcester and State of Massachusetts, have made a new and useful Improvement in Wagon-Dashers; and I do hereby declare the following to be a full, clear, and exact description thereof, reference being had to the accompanying drawings, which constitute a part of this specification.

The object of my invention is to provide a wagon-dasher that shall be movable at will, and cannot only be taken off and laid aside when desired, but can also be swung to one side when entering or alighting from the wagon. To accomplish these results I connect the dasher to the wagon-body by means of a vertical swivel-pin projecting from the under side of the dasher, at or near its center, and adapted to rotate within a tubular bearing or socket provided for it and attached to the front end of the wagon-body.

Referring to the accompanying drawings, Figure 1 is a perspective view of a wagon-body, A, provided with my improved dasher B, the dasher being shown as swung to the left, as would be done when entering the wagon from the front, as is usual in this class of vehicles. Fig. 2 is a vertical cross-section through the supporting-pivot C, the pivot being bent or offset below the dasher in order to bring the dasher in line with the front of the wagon-body.

The pivot C is preferably made integral with the frame-work or skeleton of the dasher, and is supported within the tubular socket D, which is firmly attached to the wagon-body.

The lower end of the pivot C is flattened, as shown at $d$, such flattened part being pressed by the spring $e$, which operates to return the pivot and dasher to their normal position after being deflected, as shown in Fig. 1.

I am aware that the pivot C might be extended to the top of the dasher, as an independent rod, and each half of the dasher hinged to such rod, and swing thereon independently of the other half; but I regard the construction shown as most desirable for practical use.

It will be observed that, in addition to the rotary motion shown, the dasher can be lifted from its socket and laid aside, when desired, without any adjustment or readjustment of the parts whatever.

Having thus described my invention, what I claim is—

1. A wagon-dasher pivoted to the wagon-body and adapted to be rotated upon a vertical axis, as described.

2. A wagon-dasher pivoted to the wagon-body and adapted to be removed from its supporting-socket, as set forth.

3. A wagon-dasher pivoted to the wagon-body, as set forth, combined with a spring operating to return the dasher to its normal position, substantially as described.

In testimony whereof I have affixed my hand hereunto in the presence of two subscribing witnesses.

ELIJAH MYRICK.

Witnesses:
J. R. GRAY,
M. H. GRAY.